Jan. 12, 1926.
R. O. WORKMAN
COFFEEPOT
Filed April 2, 1925
1,569,445
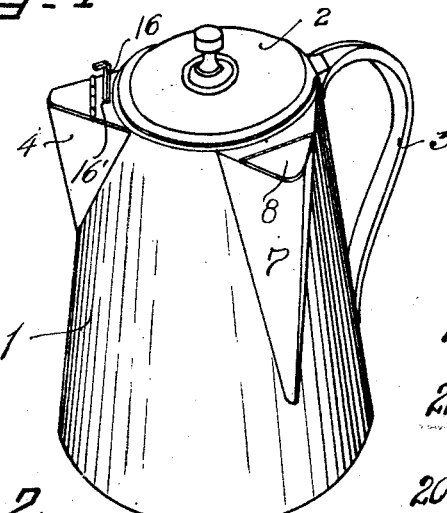
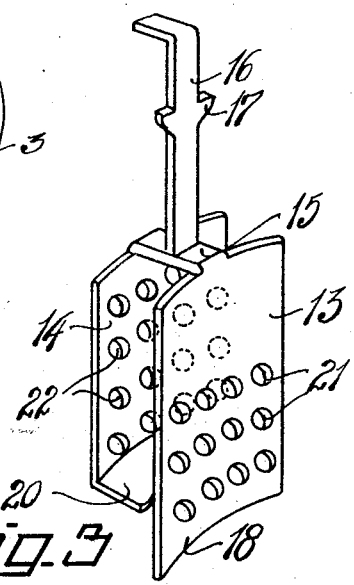
Inventor
Ross O. Workman
By Herbert E. Smith
Attorney Patented Jan. 12, 1926.

1,569,445

UNITED STATES PATENT OFFICE.

ROSS O. WORKMAN, OF CHEWELAH, WASHINGTON.

COFFEEPOT.

Application filed April 2, 1925. Serial No. 20,169.

*To all whom it may concern:*

Be it known that I, Ross O. Workman, a citizen of the United States, residing at Chewelah, in Stevens County and State of Washington, have invented certain new and useful Improvements in Coffeepots, of which the following is a specification.

My present invention relates to improvements in coffee pots and utensils of that type, and while I have illustrated and shall refer to the utensil as a coffee pot it will be understood that the invention is capable of embodiment in various other utensils, as for instance in a tea pot. The primary object of the invention is the provision of a utensil of this character having an auxiliary water chamber combined with the coffee pot and provided with means whereby a supply of water may readily be utilized as for the purpose of weakening the strength of the coffee, or for other purposes. The invention consists in certain novel combinations and arrangements whereby the coffee or water may selectively be poured from a single spout for use as required, as will hereinafter be more fully set forth and claimed.

In the accompanying drawings I have illustrated one complete example of the physical embodiment of my invention wherein the parts are combined and arranged in accord with the best mode I have thus far devised for the practical application of the principles of my invention.

Figure 1 is a perspective view of a coffee pot embodying my invention.

Figure 2 is a vertical sectional view of the coffee pot of Figure 1.

Figure 3 is a perspective view of the control valve for coffee and water.

Figure 4 is a horizontal perspective view of the coffee pot at the pouring spout showing the relation thereto of the control valve.

Figure 5 is a vertical sectional view showing part of the valve in its relation to the coffee pot and spout.

In carrying out my invention the utensil may be fashioned of any suitable material and shape, and the device herein shown as a coffee pot comprises the metallic receptacle 1 of the standard size and shape for coffee pots. This vessel or receptacle indicated as a whole by the numeral 1 is provided with a usual form of hinged lid 2 and handle 3, and has the well known type of spout or pouring nozzle 4. Within the utensil is located an inner pot 5 suspended at 5' suspended or supported in suitable manner, from the top portion of the vessel 1 and adapted to receive the water and coffee for the preparation of the beverage. The bottom of the inner pot is elevated from the bottom of the vessel 1 and the sides of the pot are spaced from the walls of the vessel to form an annular water chamber 6 for the auxiliary supply of water.

At a position approximately at right angles to the pouring spout 4 the vessel 1 is fashioned with an inlet chamber 7 for water and a hinged lid 8 normally closes the chamber. Water is supplied to the pot 5 through the open lid 2 and water is supplied to the annular water chamber through the open lid 8.

Either water or coffee may be poured through the spout 4, and if desired water in the auxiliary chamber may be emptied through the inlet chamber 7 when the lid 8 is open.

Between the pouring spout and the coffee pot 5 and located in a portion of the annular space 6 is located a casing 9, the side and bottom walls of which combine with the walls of the vessel 1 and pot 5 to form an enclosure. The bottom horizontal wall of the casing is provided with apertures as 10 opening from the water chamber into the casing, and the wall of the pot 5 is provided with transverse holes 11 opening from the pot to the casing for passage of the beverage. The wall of the vessel 1 is provided with holes 12 opening to the spout from the casing, and the casing walls have imperforate or closed ends.

For selectively pouring the beverage from the coffee pot or water from the auxiliary water chamber I utilize a slide valve which normally closes the openings 10 in the casing and is normally open to permit pouring of coffee. This slide valve is located in the casing between the pot and the spout and is fashioned with an inner rectangular plate 13 and a spaced outer plate 14 curved to conform to the shape of the utensil and vertically slidable in the casing. At their upper ends these plates are connected by a transverse bridge bar 15 and a handle 16 which extends upwardly from said bar through the casing as at the slot 16' in Figure 1, is provided with stops or shoulders 17 to engage against the underside of the top wall of the casing to prevent excess movement of the valve.

The lower free end of the inner plate 13 is extended as at 18 to seat in a socket 19 of the casing and the lower end of the outer valve plate 14 is provided with a horizontal flange 20 which normally rests upon the perforated bottom wall of the casing to close the casing against entrance thereto of water from the water chamber.

These valve plates are perforated, the inner plate being provided with openings 21 adapted to register with openings 11 to the coffee pot and the outer valve plate 14 having openings 22 to register with the spout openings 12.

To insure adequate frictional engagement between the slide plates of the valve and the inner faces of the casing, these plates may be somewhat resilient and a spring 23 is interposed between them to urge them in close contact with the perforated walls of the casing.

An extra row of perforations 22 is provided at the lower end of the plate 14, which row is normally closed by the valve and it will be apparent by an inspection of Figure 5 that when the valve is lifted to bring the flange 20 to dotted position the ports 11 will be closed and ports 10 and the lower row of ports or openings 22 will be opened, thus permitting water to flow from the water chamber through the casing, valve and spout for pouring as into a coffee cup when it is desired to weaken the coffee, previously poured from the pot 5.

With the valve in normal position the utensil may be used in manner well known for pouring coffee or other beverage and the auxiliary supply of water is brought into use when desired by lifting the valve as described.

Having thus fully described my invention what I claim as new and desire to secure by Letters Patent is—

1. The combination with a utensil having an inner pot forming annular chamber and having a pouring spout, of a casing between said pot and utensil and having ports communicating with said pot, chamber and spout, of a slide valve comprising spaced ported plates and adapted to normally close the ports to said chamber and adapted for use to selectively establish communication between said spout and either the pot or the chamber.

2. The combination with a vessel having a pot therein forming an auxiliary water chamber and a valve casing between said vessel and pot, a spout on the vessel and ports in said casing opening to the pot, chamber, and spout, a slide valve in the casing comprising spaced perforated plates, and an imperforate angular plate on one of said plates for normally closing the ports communicating with said chamber.

In testimony whereof I affix my signature.

ROSS O. WORKMAN.